(12) United States Patent
Holmberg et al.

(10) Patent No.: US 8,645,185 B2
(45) Date of Patent: Feb. 4, 2014

(54) LOAD BALANCED PROFILING

(75) Inventors: Per Holmberg, Stockholm (SE); Mats Holmberg, Kista (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 944 days.

(21) Appl. No.: 12/517,992

(22) PCT Filed: Dec. 6, 2006

(86) PCT No.: PCT/SE2006/050555
§ 371 (c)(1),
(2), (4) Date: May 5, 2010

(87) PCT Pub. No.: WO2008/069715
PCT Pub. Date: Jun. 12, 2008

(65) Prior Publication Data
US 2010/0318994 A1    Dec. 16, 2010

(51) Int. Cl.
*G06Q 10/00* (2012.01)
(52) U.S. Cl.
USPC .................................................. 705/7.29
(58) Field of Classification Search
USPC .................................................. 705/7.38, 7.29
See application file for complete search history.

(56) References Cited

U.S. PATENT DOCUMENTS

| | | | |
|---|---|---|---|
| 5,960,198 A | 9/1999 | Roediger et al. | |
| 6,542,854 B2 * | 4/2003 | Yang et al. | 702/186 |
| 6,859,882 B2 * | 2/2005 | Fung | 713/300 |
| 7,143,128 B1 * | 11/2006 | Baweja et al. | 709/201 |
| 7,757,236 B1 * | 7/2010 | Singh | 718/105 |
| 2004/0060043 A1 | 3/2004 | Frysinger et al. | |
| 2004/0267548 A1 * | 12/2004 | Jones | 705/1 |

FOREIGN PATENT DOCUMENTS

EP    0501076 A2    9/1998

* cited by examiner

*Primary Examiner* — Romain Jeanty (57) ABSTRACT

A method, load regulator, and profiling tool for monitoring and analyzing system performance and spare CPU capacity in a system such as a telecommunication system. The load regulator and profiling tool utilize a communication interface to balance the profiling performance of the profiling tool with the available spare CPU capacity in the system. The load regulator regularly sends information to the profiling tool of any spare CPU capacity during profiling, and the profiling tool adjusts the profiling performance gradually in response to the received information.

7 Claims, 5 Drawing Sheets

LOAD BALANCED PROFILING

TECHNICAL FIELD

The present invention relates to a method of profiling in a load regulator and in a profiling tool of a system, and to a load regulator and a profiling tool.

BACKGROUND

In order to evaluate the behaviour and performance of a computer system or a telecommunication system in real time and at different workloads, a so-called profiling tool may monitor the system performance and conduct a performance analysis in order to obtain the desired profile information. Such a profiling tool, i.e. a profiler, is capable of recording information at specific points of time or at specific events and of displaying the profile information, e.g. as a stream of recorded sample information or as a statistical summary.

The profiling information collected by a profiling tool is essential for the system characterization, and for enabling improvements in details and in the overall performance, as well as for identifying specific performance-related problems. However, some real time systems are not provided with any profiling capability at all, and some profiling tools may be unreliable or may need to be operated by a specialist in order to avoid disturbances, of the real-time system, and a corresponding reduced system performance. Other known profiling tools have a limited controllability and a low detail level of the collected information, in order to achieve reliability and a low performance-impact.

A suitable implementation of recording information for real-time profiling may comprise an interruption of the execution of a running program code at regular sampling intervals or at certain events, and conventional techniques for profiling include sampling techniques and instrumentation techniques, of which the sampling technique normally is more suitable for real-time profiling than instrumentation techniques.

Sampling techniques involve an interruption of the execution and a collection of data, and may be subdivided into periodic instruction profiling and event profiling, of which instruction profiling performs interruptions with specific time intervals to approximate a random behaviour, while event profiling interrupts the execution and collection of data at specific events. The instruction profiling is non-intrusive, and a reliable profile can be obtained comparatively quickly, and it may e.g. be used to obtain a profile of which part of a code that a processor executes the most by interrupting the execution periodically, with a certain sampling interval, and saving the instruction address.

The event profiling is also non-intrusive, but it takes longer to obtain a reliable profile. Event profiling may e.g. be used to obtain a profile of cache misses by interrupting the execution at every 1000 cache miss and recording the address and the time interval between these interruptions.

The capacity overhead caused by sampling profiling can be controlled by selecting an appropriate length of the sampling intervals, but it will also depend on the amount of collected information.

However, in event profiling techniques, only a few different and predefined parameters can be sampled, which may limit the profile. In sampling profiling, events may be missed if they do not occur in a sampling moment, which makes it unsuitable for obtaining a profile of the occurrence of rare events.

The instrumentation techniques may be subdivided into static and dynamic instrumentation, and static instrumentation involves instrumenting a binary code with added instructions for saving profiling information, e.g. each instruction that changes the control flow and causes a jump in the code to save the target address, in order to obtain a profile of which parts of the coded that is executed the most. By means of instrumentation profiling, a more detailed and complete information can be collected regarding individual instructions, a jump or a variable access. However, it consumes more capacity resulting in a large profiling capacity overhead, and a detailed instrumentation may slow down the system 10 times or more. Therefore, in order to achieve a lower overhead, the instrumentation must be limited to only a small fraction of the code, or be less detailed, which makes it unsuitable for real time systems. Further, two versions of the code will exist, the production method and the instrumented version, requiring switching between the two versions.

The conventional dynamic instrumentation is the latest and the most advanced profiling, method, and it may be programmable to enable an application specific profiling. A dynamic instrumentation tool inserts instrumentation points by replacing an instruction with a jump to a patch area, thereby achieving a dynamic modification of the instructions. The patch area comprises data associated with each instrumentation point, including instructions to be executed regarding the profiling, as well as instructions to return to the instrumentation point.

A dynamic instrumentation tool is capable of collecting both overall information and detailed information, and may be used interactively to first obtain a profile regarding an overall picture and thereafter to obtain a detailed profile regarding specific parts of said overall picture. Further, it is capable of safe collection of all occurrences of certain events, and is thereby suitable for obtaining a profile of rare events. However, a drawback of dynamic instrumentation is the large capacity overhead and that the size of this overhead can not be guaranteed, i.e. there is no guaranteed maximum capacity overhead. Additionally, the overhead is difficult to calculate, since it depends both on the profiling instruction and how often it is triggered, which may be unknown.

Related art within the technical field is further disclosed e.g. in the U.S. Pat. No. 5,689,636 and U.S. Pat. No. 5,794,011. U.S. Pat. No. 5,689,636 describes a real-time tracing system which causes a dynamic load, which is monitored by the tracing system itself. The tracing system also deactivates itself when this dynamic load exceeds a certain threshold value. A trace differs from a profile in that it represents a complete record of the steps executed of a program, while a profile is only a statistical display of a collection of selected events. U.S. Pat. No. 5,794,011 describes a performance regulating program for external units of a real-time system, and the program monitors and controls the performance level of the external units in order to avoid overload.

A conventional load regulating system in e.g. a telecommunication system supervises the system load and controls the traffic in order to avoid overload situations, which will lead to long delays and time-outs. A typical function of a telecommunication system load regulating function is to reject new calls before overload occurs when the load reaches, a predetermined limit, i.e. the maximum loadability. Thereby, the system will avoid overload, and use its capacity to handle real traffic instead of handling emergency tasks caused by overload. A computer control system is normally designed with different task priorities, and traffic handling is a high-priority task for both telecom and datacommunication systems. However, fault recovery comprising handling of faults in the hardware, in the software or in a network has an even higher priority, while it is desirable that maintenance tasks, e.g. profiling, such as hardware testing and software consistency audits are prioritized with a lower priority, since the collection of data should not be allowed to disturb the traffic. However, an additional drawback with the above-described conventional profiling methods is that the implementations may have a priority that is the same or even higher than the traffic. For example, instrumentation profiling inserts instructions that is executed as a part of the application and is therefore at the same priority level as the application. Similarly, sampling profiling using counters generates interrupts that are executed with a higher priority than the traffic.

Thus, it still presents a problem to provide profiling in a real-time system with a high reliability, causing a profiling overhead that will not overload the system.

SUMMARY

The object of the present invention is to address the problem outlined above, and this object and others are achieved by the method in a load regulator and in a profiling tool, and by the load regulator and profiling tool, according to the appended independent claims.

According to one aspect, the invention provides a method in a load regulator of a system comprising a profiling tool, the load regulator regularly monitoring the spare CPU capacity in said system. The load regulator balances the profiling load with the spare CPU capacity in the system during profiling by regularly controlling the profiling performance of the profiling tool using a communication interface to said profiling tool, and the method comprises the step of the load regulator regularly informing the profiling tool of the spare CPU capacity in the system during profiling.

By means of this balancing of the profiling load with the spare CPU capacity in the system, the profiling tool will be able to use more of the total system capacity when the system has free CPU capacity available, enabling a more precise and/or a faster profiling result, and still avoid overloading the system.

The method may comprise the further step of the load regulator instructing the profiling tool to gradually reduce the profiling performance, if there is no spare CPU capacity in the system, and the load regulator may allow a profiling request from the profiling tool, if the system has spare CPU capacity. Additionally, the load regulator may increase the CPU-capacity, if there is no spare CPU capacity in the system.

According to another aspect, the invention provides a method in a profiling tool of a system comprising a load regulator that regularly monitors the CPU-load in said system. The profiling tool balances the profiling load with the spare CPU capacity in the system by gradually adjusting the profiling performance in response to information regarding available CPU capacity received regularly during profiling from the load regulator over a communication interface.

The profiling performance may be adjusted in predetermined steps, and the profiling tool may send regular updates to the load regulator regarding an ongoing profiling activity.

Further, the profiling tool may request profiling allowance from the load regulator before increasing the profiling performance, and before initiating a new profiling operation, which may have an unknown, or a guaranteed maximum, profiling overhead.

According to yet another aspect, the invention provides a load regulator for a system comprising a profiling tool, and the load regulator comprises an arrangement for regularly monitoring the spare CPU-capacity of the system. The load regulator is further provided with an arrangement for balancing the load of a profiling tool with the spare CPU capacity in the system during profiling, said arrangement comprising:

An interface for communicating with the profiling tool;
A profiling controller capable of a controlling the profiling performance of the profiling tool by regularly informing the profiling tool of the spare CPU capacity in the system during profiling.

The profiling controller may be arranged to instruct the profiling tool to gradually reduce the profiling performance, if there is no spare CPU capacity in the system, or to instruct the profiling tool to terminate the profiling.

Further, the profiling controller may be arranged to allow a profiling request from the profiling tool, if the system has spare CPU capacity, and to increase the CPU-capacity, if there is no spare CPU capacity in the system.

According to still another aspect, the invention provides a profiling tool for a system comprising a load regulator arranged to regularly monitor the spare CPU capacity of the system. The profiling tool is provided with an arrangement for balancing the profiling load with the spare CPU capacity during profiling, said arrangement comprising:

An interface for communicating with the load regulator;
A profiling adjuster arranged to gradually adjust the profiling performance in response to information received regularly from the load regulator during the profiling The profiling adjuster may be arranged to adjust the profiling performance in predetermined steps, and to terminate the profiling.

The profiling adjuster may be further arranged to request allowance from the load regulator before initiating a new profiling operation, and the new profiling operation may have an unknown, or a guaranteed maximum; profiling overhead.

Said profiling adjuster may be arranged to request allowance from the load regulator before increasing the profiling performance, and to send regular updates to the load regulator regarding an ongoing profiling activity.

Said profiling tool is arranged to perform e.g. sampling profiling or static or dynamic instrumentation profiling, or any combination thereof, and the gradual adjustment of the profiling performance may comprise e.g. a change of the sampling interval, a change of a dynamic instrumentation, an insertion or a removal of an instrumentation point or of a sampling event, or an early exit from a profiling routine.

Further, said spare CPU capacity may correspond to the difference between the maximum loadability and the total CPU load in the system.

BRIEF DESCRIPTION OF THE DRAWINGS

The present invention will now be described in more detail and with reference to the accompanying drawings, in which:

FIG. 2a is a illustrates schematically the capacity levels in a system, while

DETAILED DESCRIPTION

In the following description, specific details are set forth, such as particular arrangements and sequences of steps in order to provide a thorough understanding of the present invention. However, it is apparent to a person skilled in the art that the present invention may be practised in other embodiments that may depart from these specific details.

Moreover, it is apparent that the described functions may be implemented using software functioning in conjunction with a programmed microprocessor or a general purpose computer, and/or using an application specific integrated circuit. Where the invention is described in the form of a method, the invention may also be embodied in a computer program product, as well as in a system comprising a computer processor and a memory, wherein the memory is encoded with one or more programs that may perform the described functions.

This invention regularly and continuously balances the profiling tool performance with the available CPU capacity in the system, during an entire profiling operation, and the invention involves providing a conventional load regulator for supervising the traffic load in a system with an additional functionality to regularly control the profiling performance of a profiling tool in said system during profiling. The profiling tool is arranged to perform e.g. sampling profiling or static or dynamic instrumentation profiling, or any combination thereof, and is further provided with an additional functionality to gradually reduce or increase the profiling load by a suitable gradual adjustment of the profiling operation in order to continuously balance the load of the profiling overhead with the available CPU capacity in the system during the profiling, depending on the total CPU load of the profiling tool and of the other applications in the system.

Thus, a conventional load regulating function in a telecommunication system controls and balances the traffic load with the available resources, and when the load reaches the maximum loadability limit of the system, traffic may be rejected in order to avoid overload and recovery procedures. According to this invention, a profiling balancing functionality is introduced in a load regulator and in a profiler, enabling communication between the load regulator and the profiler regarding the profiling operation during profiling. When there is no spare CPU capacity in the system, the load regulator will inform the profiling tool that there is no spare capacity, or explicitly instruct the profiling tool to reduce the profiling load by a suitable adjustment of the profiling operation in order to avoid overload. Alternatively, if possible, the load regulator will increase the available CPU capacity in the system by steering the traffic and/or the profiling to another available. CPU, or instruct the CPU to increase its performance, i.e. the speed. Additionally, the load regulator will allow the profiling tool to increase the profiling performance when there is available spare CPU capacity in the system.

The introduced functionality of profiling balancing, according to this invention, may be divided into three functional parts, namely a profiling adjusting function in the profiling tool, a profiling controlling function in the load regulator, and a communication interface. The profiling adjusting function in the profiling tool is capable of "throttling" the profiling operation in order to gradually reduce the profiling load and the capacity overhead resulting from the profiling operation, with a capability to gradually increase the profiling performance, if needed, if there is spare capacity in the system. The profiling controlling function in the load regulator is capable of continuously balancing the profiling performance with the overall CPU load in the system during an entire profiling operation by monitoring of the spare CPU capacity of the system. The communication interface enables communication between the above-described profiling adjusting function in the profiler and the profiling controlling function in the load regulator, the interface comprising a profiling tool interface part and a load regulator interface part.

Figure 1:
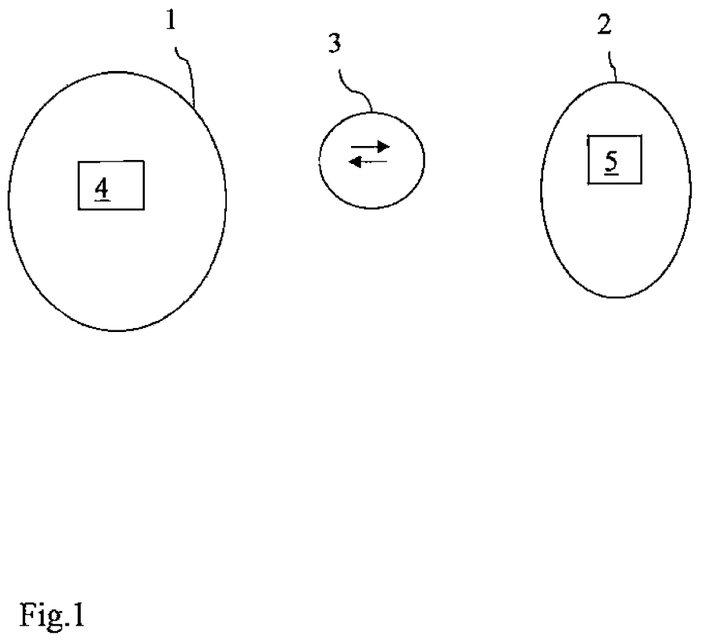
FIG. 1 is a block diagram schematically illustrating a profiling tool, a load regulator and the communication interface between them, according to this invention.

FIG. 1 illustrates schematically the three functional parts of this invention, showing a profiling tool 1, provided with a profiling adjusting functional unit, denoted profiling adjuster, 4, a load regulator 2, provided with a profiling controlling functional unit, denoted profiling controller, 5, and the interface 3 enabling communication between the profiler and the load regulator, comprising an interface part located in the profiling tool an interface part located in the load regulator.

By means of this introduced profiling balancing functionality, the load regulator in a system will be able to prioritize between the traffic handling and the profiling, and the profiler will be allowed to use more of the total system capacity, enabling a more precise and/or a faster profiling result, when the system has free CPU capacity available. On the contrary, when the system is heavily loaded, e.g. by external units, and the available capacity is limited, the load regulator may cause the profiler to throttle the profiling, i.e. to gradually reduce the profiling performance, in order to reduce the profile overhead to a level that will not disturb or limit the traffic in the system. If possible, the load regulator may steer traffic or profiling to another available CPU or increase the performance of the CPU, in order to increase the available CPU capacity in the system.

When the total capacity used by the traffic and of the profiler reaches a predetermined maximum loadability level, the load regulator is able to stop the profiling operation completely, since the profiling balancing normally prioritizes the traffic handling over the profiling. However, the load regulator will also allow the profiler to use more capacity for the profiler, i.e. to gradually increase the profiling performance, when the CPU has spare capacity, in order to achieve a faster and/or a more precise profiling, if needed.

Figure 2A:
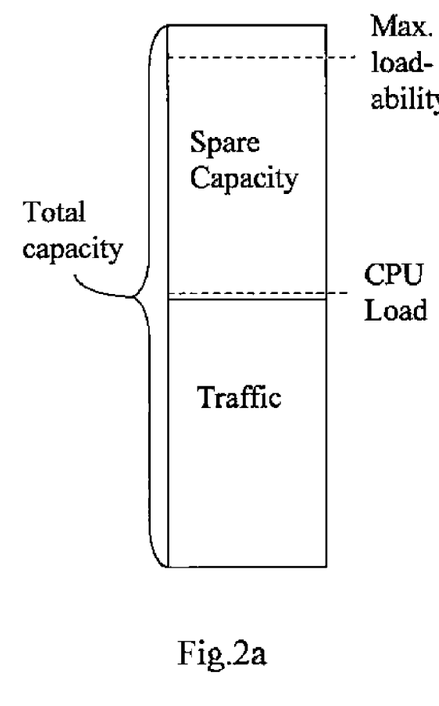
Figure 2B:
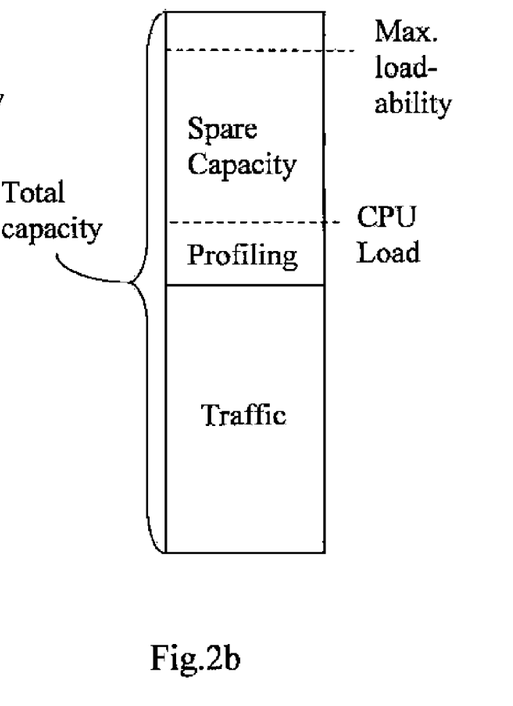
FIG. 2b illustrates the capacity levels in said system during profiling.

FIGS. 2*a* and 2*b* illustrates the level of the total CPU-capacity of a system, denoted "Total capacity" in the figures, the traffic load, indicated by "Traffic", the profiling load, i.e. the overhead caused by the profiler, indicated by "Profiling" in the figures, the total load of the traffic and the profiling, indicated by the hatched line denoted "CPU Load", the available free CPU-capacity, indicated by "Spare Capacity", and the maximum loadability, which is indicated by the hatched line denoted "Max. loadability". The FIG. 2*a* shows the system before initiation of any profiling, and the FIG. 2*b* shows the system during profiling. The spare capacity is regularly monitored during profiling by the conventional load regulating functionality of the load regulator, and the spare CPU capacity in the system corresponds to the difference between the maximum loadability and the total CPU load in the system. A conventional load regulator avoids traffic overload by rejecting traffic when the maximum loadability level of the system is reached, while a load regulator according to this invention also is capable of continuously balancing the load of the profiling tool with the traffic load and with the CPU capacity during a profiling operation.

A profiling adjusting function according to this invention may be introduced e.g. in a sampling profiler, in a static instrumentation profiler or in a dynamic instrumentation profiler, and the implementation of the profiling adjustment will be different depending on the profiler type. For example, if the load regulator would instruct the profiling adjusting function to turn the profiler off completely, the profiling adjusting function of a sampling profiler would maybe disable the sampling interrupts, while a static instrumentation profiler would be switched to its non-instrumented version, and profiling adjusting function of a dynamic profiler would remove all profiling points.

A sampling profiler may "randomly" sample the execution to determine where time is spent, which addresses that generates cache misses, etc, and it may comprise a time counter and/or an event counter for generating interrupts for the collection of profiling data, the simplest sampling profiler being only a routine that is executed at the ordinary periodic clock interrupts. A more advanced sampling profiler enabling more correct profiling data may use a separate timer for generating interrupts that are not synchronized with the clock interrupts, e.g. with a specific time interval or a specific number of events between the interrupts. This may be a good approximation of random sampling, due to the natural randomness of the program behaviour in a large communication system.

According to a first exemplary embodiment, the added functionality of the profiling adjusting function in a sampling profiler is a binary throttler, in which the profiling performance is reduced to zero by stopping the counter that generates the interrupts. In case of a clack interrupt, the profile routine is removed from the tasks to be performed at a clock interrupt.

According to a second embodiment of the profiling adjusting function in a sampling profiler, the profiling performance is gradually reduced by an increase of the sampling interval, and the profiling performance is gradually increased by a reduction of the sampling interval, which enables a stepwise control of the profiling load, e.g. in predetermined steps. Since the profiling load and the sampling interval are linearly correlated, the profiling load can be reduced by 50% by a doubling of the sampling interval. Preferably, the sampling interval can be changed dynamically during a measurement. In certain applications, the phase behaviour changes over time, and a varying sampling rate may influence the result, making dynamic changes of the sampling interval unsuitable. However, this is not the case in most communication and server applications, which typically has no, or only a limited, phase behaviour.

According to a third embodiment of the profiling adjusting function in a sampling profiler, the profiler is provided with an internal counter and is arranged to save profiling data at only a predetermined fraction of the interrupts. Thereby, the profiling load can be gradually reduced or increased, e.g. in predetermined steps, but it can not be removed entirely.

Further exemplary embodiments of a profiling adjusting function in a sampling profiler includes various combination of the above-described embodiments, in order to achieve e.g. an initial gradual reduction of the profiling load using a profiling adjusting function according to the third embodiment, but an eventual shut-dawn, if needed, e.g. by using a profiling adjusting function according to the first embodiment.

A static instrumentation profiler is a separate, instrumented version of the program code, which is provided with added instructions for saving the instrumentation data. The profiling adjusting function for a static instrumentation profiler enables switching between the instrumented version and the non-instrumented version, which means that the profiling is stopped completely. Another option in order to reduce the profiling performance in a static instrumentation profiler is an early exit of a routine.

Figure 3:
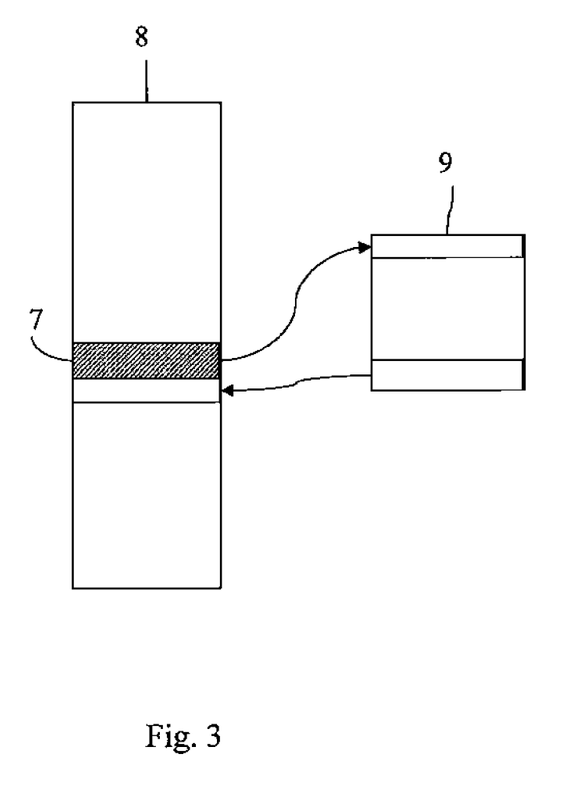
FIG. 3 illustrates the program code in a dynamic instrumentation profiling tool.

In a dynamic instrumentation profiler, the profiling instrumentation code is inserted dynamically, typically be means of replacing an instruction in the code with a jump to a pre-reserved patch area. In this patch area, the instructions for the profiling are stored, as well as for executing a replaced instruction, for restoring a state before the jump to the code area, and for jumping back. FIG. 3 illustrates a program code 8 and a patch area 9 in a dynamic instrumentation profiler, in which a jump instruction to the said patch area 9 is inserted in the instrumentation point 7 of the program code 8.

A first embodiment of the profiling adjusting function for a dynamic instrumentation profile is capable of removing instrumentation points dynamically, which may reduce the profiling performance gradually, or even stop the profiling completely.

A second embodiment of the profiling adjusting function for a dynamic instrumentation profiler comprises an internal counter, which saves the profiling only a predetermined fraction of the times of the execution of the instructions in the patch area, and exits the routine the other times. A gradual reduction of the profiling performance, e.g. in predetermined steps, as well as the resulting profiling load, is achieved by a reduction of the fraction, but the profiling will not be terminated completely. According to an exemplary embodiment, a separate internal counter is provided for each instrumentation point, and according to another exemplary embodiment, a global counter is provided for all instrumentation points, or for a group of points, which may be of a specific type.

An third embodiment of the profiling adjusting function for a dynamic instrumentation profiler tool supports arbitrary actions in the instrumentation points, which may comprise a conditional saving of profiling data when a user specific condition is fulfilled, or an entirely user programmable instruction, which is compiled and inserted in the instrumentation point.

A further embodiment of the profiling adjusting function for a dynamic instrumentation profiler includes various combination of the above-described embodiments, in order to achieve e.g. an initial gradual reduction of the profiling load using a profiling adjusting function according to the second embodiment, but an eventual shut-down, if needed, by using a profiling adjusting function according to the first embodiment.

Additionally, an early exit of a routine may be performed in a profiling adjusting function in a profiler tool of any type in order to reduce the profiling performance, but the early exit normally results in a larger reduction of the profiling overhead during static and dynamic instrumentation profiling than during sampling profiling.

The interface 3 between the profiling adjusting function in the profiler tool and the profiling controlling function in the load regulator controls the interaction between the load regulator and the profiling tool by enabling communication relating to the profiling performance between the profiler tool and the load regulator during profiling. According to an exemplary embodiment, the profiler tool sends regular updates to the profiling controller in the load regulator regarding ongoing profiling activities, and may also send profiling requests to the load regulator before starting new profiling operations and before increasing the profiling overhead from ongoing profiling operations, in order to inform the load regulator that the profiling tool wants to use more CPU capacity. If spare capacity is available, the load regulator will allow the profiling request, and will also send regular updates to the profiler tool indicating any spare capacity, thereby enabling the profiler tool to increase the profiling level in order to achieve e.g. a more detailed profiling.

Figure 4:
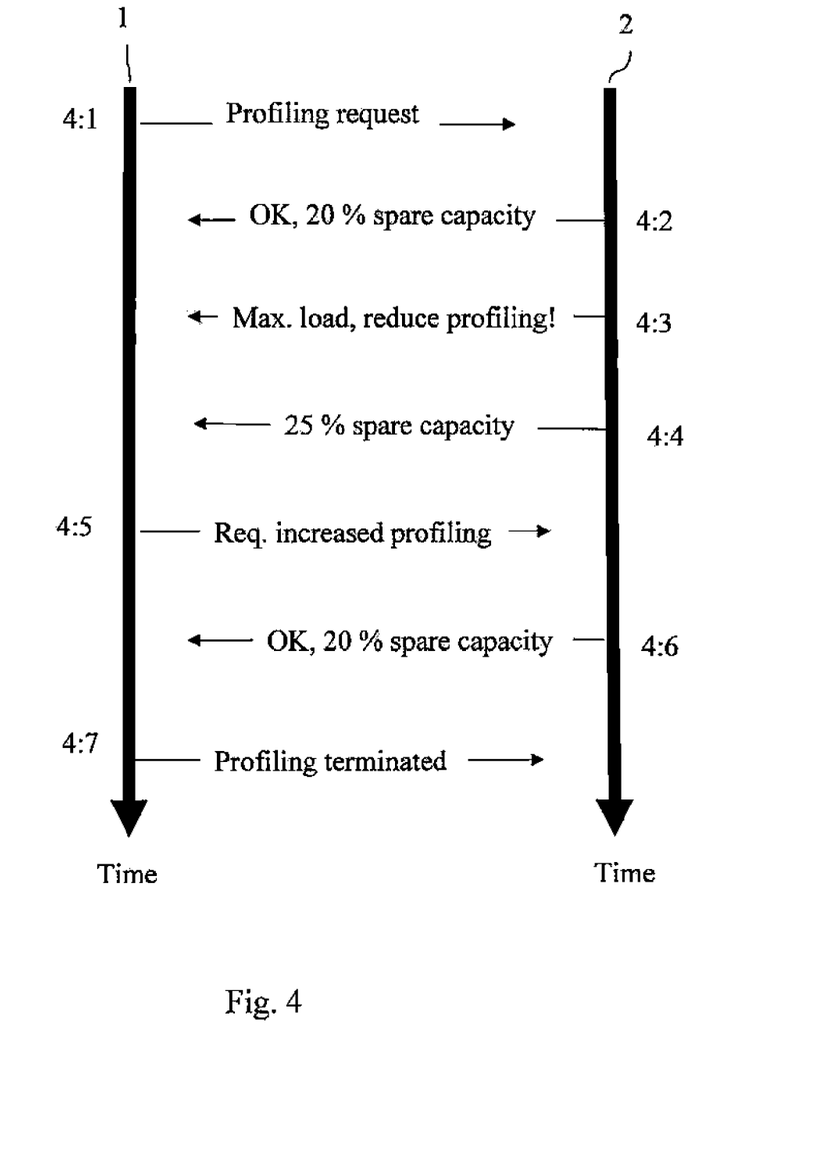
FIG. 4 is a signalling diagram illustrating an exemplary signalling session between the profiling tool and the load regulator, according to an embodiment of the invention.

FIG. 4 is a signalling diagram illustrating signalling between a profiling tool 1 and a load regulator 2 regarding the profiling balancing, according to an exemplary embodiment of this invention. In step 4:1, the profiling tool sends a profiling request to the load regulator, with an unknown capacity need. In step 4:2, the load regulator responds by allowing the requested profiling and indicating that the spare capacity is 20%. The profiling tool will initiate the profiling, and the load regulator regularly monitors the spare CPU capacity during the profiling, and if detecting that no spare CPU capacity is available, the load regulator sends a profiling reduction instruction to the profiling tool, in step 4:3, and in step 4:4 the load regulator indicates a spare capacity of 25% in the system after said profiling performance reduction. Thereafter, in step 4:5, the profiling tool requests an increase of the profiling performance again, and in step 4:6, the load regulator allows the request, and informs the profiling tool that the spare capacity in the system presently is 20%. Finally, in step 4:7, the profiler informs the load regulator that the profiling is terminated.

According to the exemplary embodiment illustrated in the signalling diagram in FIG. 4, the profiling is launched with an unspecified capacity need, and the profiler tool uses the information received from the load regulator to adjust the profiling performance to achieve an acceptable profiling load. This embodiment is suitable e.g. when the profiler is a dynamic instrumentation profiler, in which the required profiling capacity load may depend on how often a monitored event occurs in a system.

According to a second embodiment, the profiling is launched with a guaranteed low profiling load, which is suitable e.g. for a sampling profiler that can sample at a low default rate and increase the sampling rate based on information from the load regulator regarding available capacity.

Figure 5:
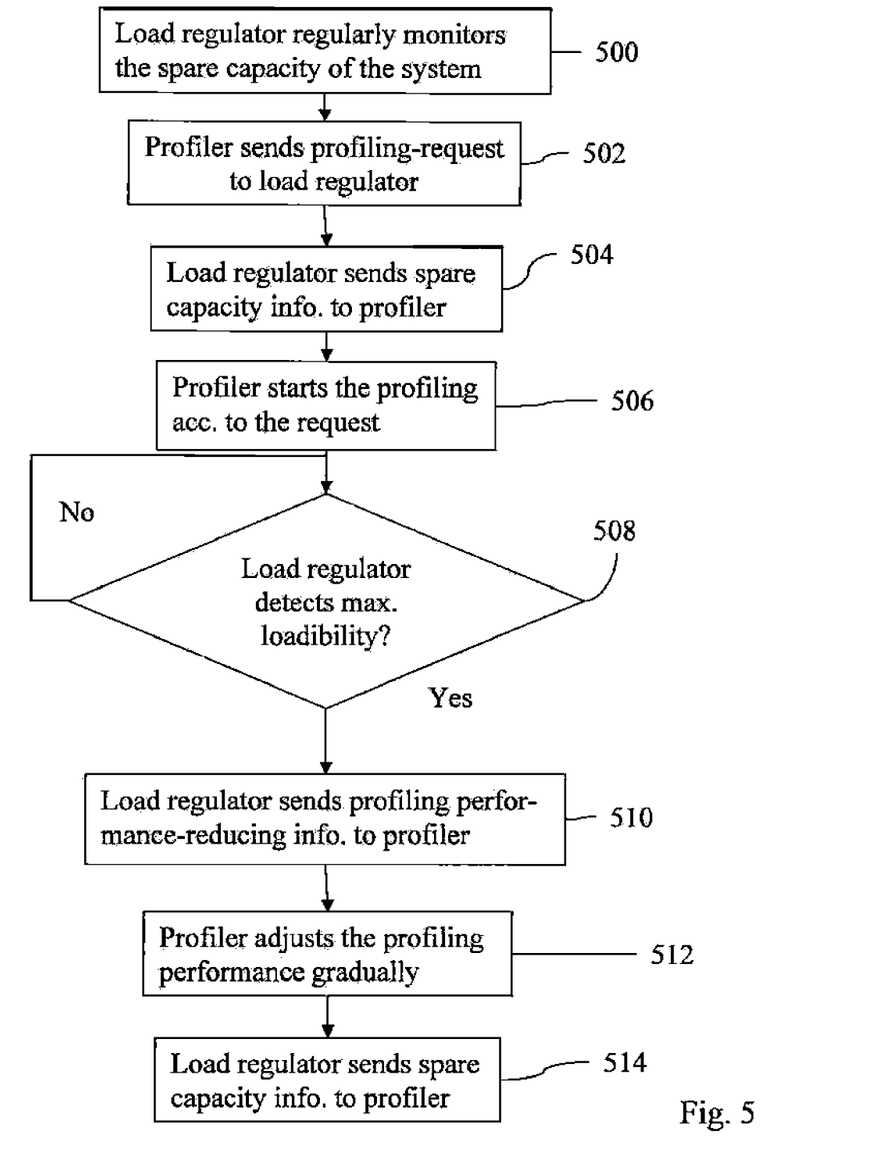
FIG. 5 is a flow diagram illustrating the functions of the profiling tool and the load regulator, according to an exemplary embodiment of this invention.

FIG. 5 is a flow diagram illustrating another exemplary profiling balancing procedure, and step 500 indicates the regular monitoring of the spare capacity in the system performed by the load regulator. In step 502, the profiler tool sends a profiling requesting message to the load regulator, with an unknown or a guaranteed profiling overhead, and in step 504 the load regulator allows the profiling, and sends spare capacity information to the profiler. In step 506, the profiler initiates profiling according to the profiling request. The load regulator regularly monitors any spare capacity, and when in step 508 it is determined that there is no spare CPU capacity available anymore, since the maximum loadability limit is reached, the load regulator sends a message, in step 510, to the profiler that the profiling performance has to be reduced. In step 512, the profiler gradually adjusts the profiling performance by throttling the profiling operation in order to reduce the profiling performance, and in step 514, the load regulator informs the profiler of the spare capacity in the system after said throttling.

The described profiling balancing according to this invention enables a more detailed profiling regarding hardware and software parameters, thereby achieving a faster and more reliable evaluation of the performance of new applications, based on real time systems. Since multiple workloads may be analysed, an improved knowledge can be obtained of detailed system characteristics with a real traffic mix. Further, system behaviour may be verified, lab results can be compared with live systems, and system configurations can be optimized, while an improved customer support is facilitated, as well as use of advanced dynamic profiling tools in real time systems with an improved flexibility.

While the invention has been described with reference to specific exemplary embodiments, the description is in general only intended to illustrate the inventive concept and should not be taken as limiting the scope of the invention.

The invention claimed is:

1. A method in a load regulator of a system having a profiling tool, the load regulator regularly monitoring spare CPU capacity in the system and balancing a profiling load with the spare CPU capacity in the system during profiling by regularly controlling the profiling performance of the profiling tool using a communication interface to the profiling tool, the method comprising the steps of:
   receiving a profiling request from the profiling tool;
   determining whether the system has spare CPU capacity, wherein the spare CPU capacity corresponds to a difference between a maximum loadability and a total CPU load in the system;
   allowing the profiling request if the system has spare CPU capacity; and
   regularly informing the profiling tool of the spare CPU capacity in the system during profiling.

2. The method according to claim 1, further comprising instructing the profiling tool to gradually reduce the profiling performance, if there is no spare CPU capacity in the system.

3. The method according to claim 1, further comprising increasing the CPU-capacity by the load regulator if there is no spare CPU capacity in the system.

4. A load regulator in a system having a profiling tool, the load regulator for regularly monitoring spare CPU-capacity of the system and for balancing a load of the profiling tool with the spare CPU capacity in the system during profiling, said load regulator comprising:
   an interface for communicating with the profiling tool;
   a monitor for monitoring spare CPU-capacity of the system; and
   a profiling controller for allowing a profiling request from the profiling tool if the system has spare CPU capacity and for controlling the profiling performance of the profiling tool by regularly informing the profiling tool of the spare CPU capacity in the system during profiling, wherein the profiling controller includes means for instructing the profiling tool to terminate the profiling when the total used CPU capacity reaches a predetermined maximum loadability level.

5. The load regulator according to claim 4, wherein the profiling controller includes means for instructing the profiling tool to gradually reduce the profiling performance if there is no spare CPU capacity in the system.

6. The load regulator according to claim 4, wherein the profiling controller includes means for increasing the CPU-capacity if there is no spare CPU capacity in the system.

7. A load regulator in a system having a profiling tool, the load regulator for controlling profiling performance of the profiling tool, said load regulator comprising:
   an interface for communicating with the profiling tool:
   a monitor for monitoring computer processing unit (CPU) capacity of the system and determining whether there is spare CPU capacity:
   a profiling controller for allowing a profiling request from the profiling tool upon determining the system has spare CPU capacity, wherein the spare CPU capacity corresponds to a difference between a maximum loadability and a total CPU load in the system, wherein the profiling controller is configured to control the profiling performance of the profiling tool by utilizing the interface to regularly inform the profiling tool of the spare CPU capacity in the system during profiling, thereby balancing a profiling load with the spare CPU capacity in the system during profiling.

* * * * *

UNITED STATES PATENT AND TRADEMARK OFFICE
CERTIFICATE OF CORRECTION

PATENT NO. : 8,645,185 B2  Page 1 of 1
APPLICATION NO. : 12/517992
DATED : February 4, 2014
INVENTOR(S) : Holmberg et al.

It is certified that error appears in the above-identified patent and that said Letters Patent is hereby corrected as shown below:

In the Specification

In Column 1, Line 27, delete "disturbances," and insert -- disturbances --, therefor.

In Column 2, Line 18, delete "profiling," and insert -- profiling --, therefor.

In Column 2, Line 58, delete "reaches," and insert -- reaches --, therefor.

In Column 4, Line 22, delete "profiling" and insert -- profiling. --, therefor.

In Column 4, Line 29, delete "maximum;" and insert -- maximum, --, therefor.

In Column 6, Line 65, delete "and" and insert -- and a --, therefor.

In Column 7, Line 19, delete "clack" and insert -- clock --, therefor.

In Column 7, Line 49, delete "shut-dawn," and insert -- shut-down, --, therefor.

In the Claims

In Column 10, Line 49, in Claim 7, delete "profiling tool:" and insert -- profiling tool; --, therefor.

In Column 10, Line 52, in Claim 7, delete "capacity:" and insert -- capacity; --, therefor.

Signed and Sealed this
Eighth Day of July, 2014

Michelle K. Lee
*Deputy Director of the United States Patent and Trademark Office*